May 5, 1953
H. M. REEDALL
2,637,177
CONGELATION APPARATUS AND METHOD
Filed Sept. 20, 1949
3 Sheets-Sheet 2
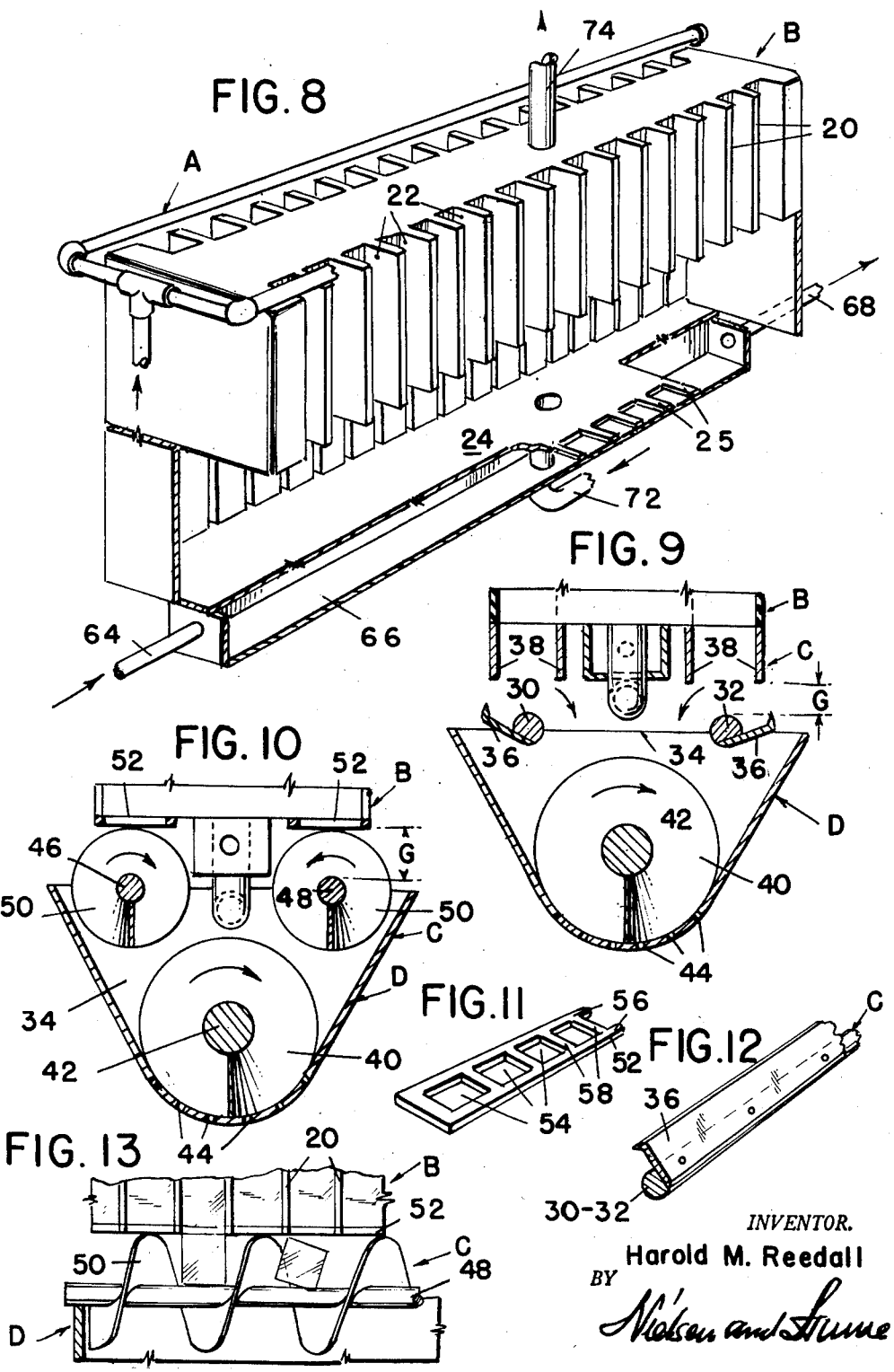
INVENTOR.
Harold M. Reedall
BY
Nielsen and Hume

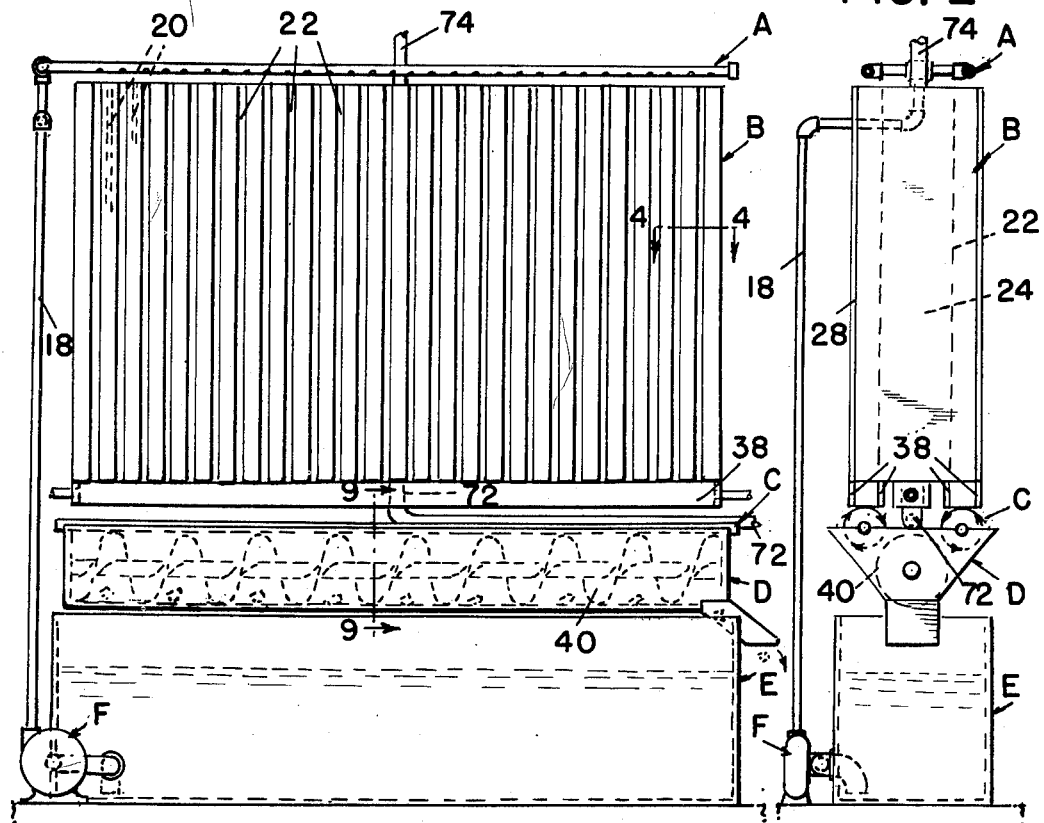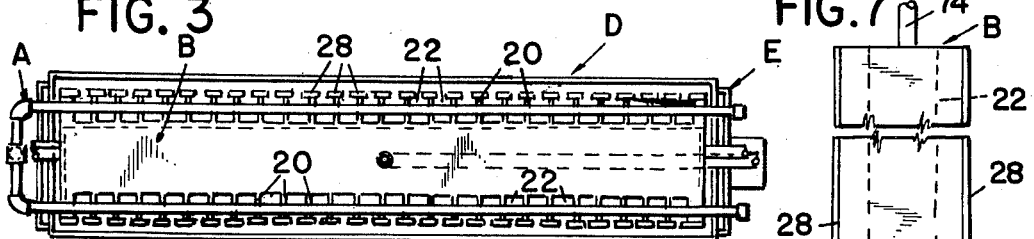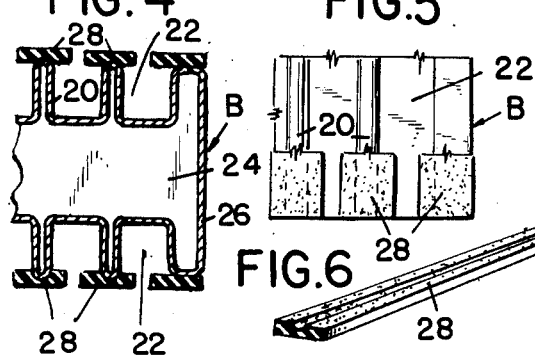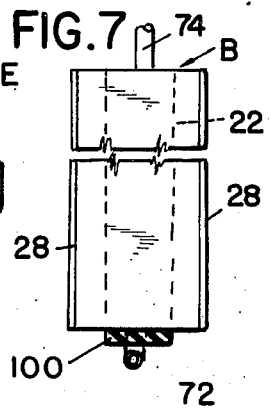

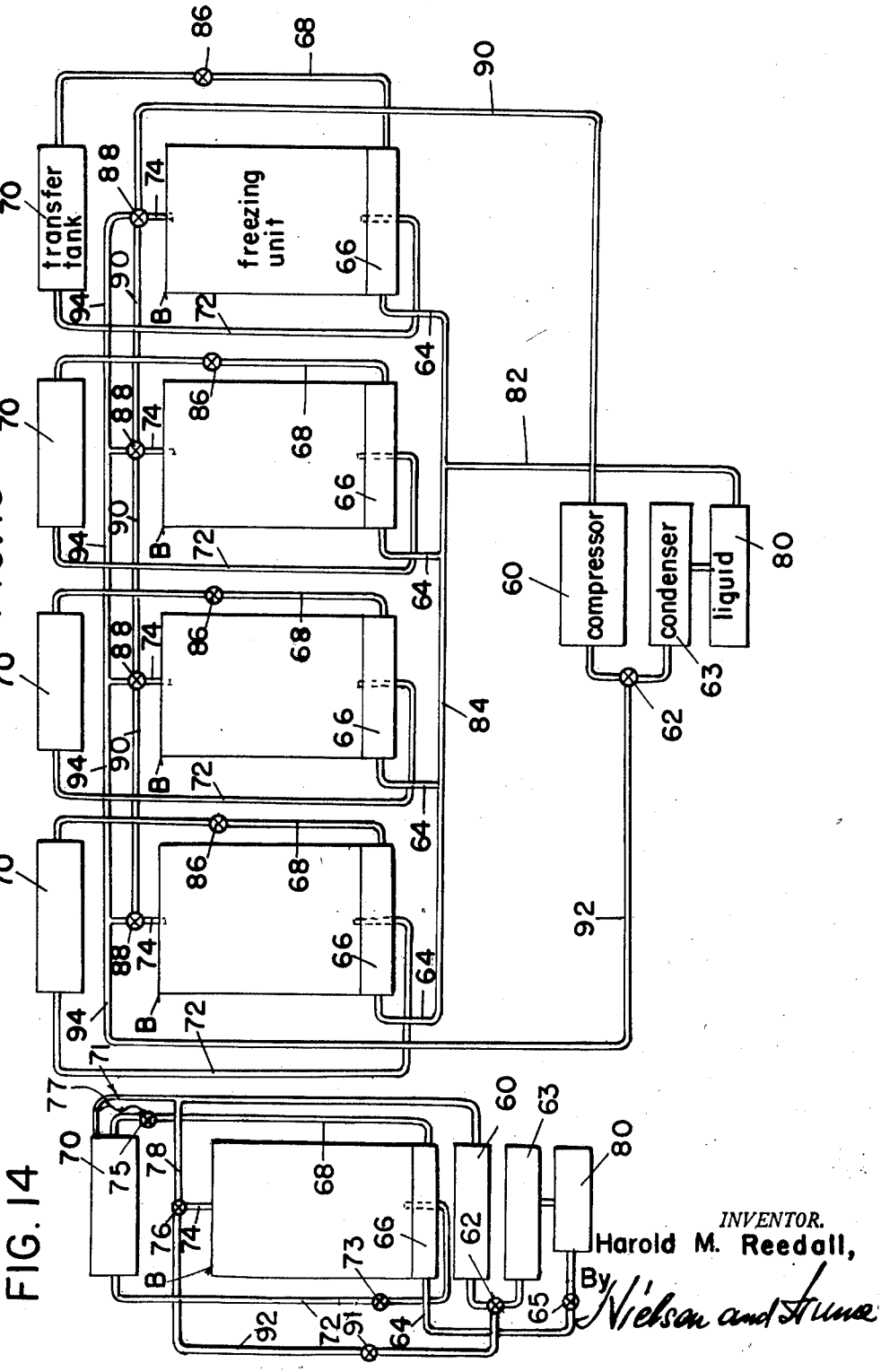

Patented May 5, 1953

2,637,177

UNITED STATES PATENT OFFICE 2,637,177

CONGELATION APPARATUS AND METHOD

Harold M. Reedall, Shaker Heights, Ohio

Application September 20, 1949, Serial No. 116,652

8 Claims. (Cl. 62—114)

This invention relates to apparatus and method for automatically solidifying essentially liquid or fluent materials in columnar molds, and for cylically releasing the molded solid from the molds in columnar form, and for cutting the columns into smaller pieces of uniform size.

More specifically, the invention is aimed at the cyclic molding and cutting to size of any fluent substance capable of congealing or agglomerating upon being cooled below its melting point, or any fluid containing an agglomerable component responsive to temperature change and conditions of flow to form a solid mass, whether this be by congelation, crystallization, precipitation or concentration.

More specifically, the invention is directed to the automatic manufacture of cubes or particles of ice or paraffin, or analogous materials common to these and related fields, such as, frozen foods, confections, and the like. For simplicity and convenience in the following description, reference is made to the manufacture of ice cubes or particles, although it will be understood that this is an example without limitation adopted merely for purposes of illustration, and that the invention embraces all similar processes and products covered in the foregoing outline as fall within the scope of the appended claims.

Incident to the formation and cutting of solids of the classes mentioned, modified aspects of the invention herein described lend themselves to that treatment of waxes, oils, and paraffines commonly referred to as "sweating," which has to do with the excretion of the non-solidifiable content from the solidifiable components thereof as a function of the phase change of the latter, in a new and improved manner.

In its elemental form, the invention contemplates a molding channel or trough having heat transfer surfaces associated with an expansion or evaporation chamber of a refrigerating system, which may be of any appropriate or conventional type. The molding channel is open at its ends, and is inclined toward the vertical so that water, or other fluid to be acted upon, may be introduced into the upper end to flow down the heat transfer surfaces to which it freezes, while any unfrozen excess runs out at the bottom of the channel, where it is caught and recirculated. When the proper mass of ice is attained, the refrigerant is intermitted, and a thawing medium is introduced to the chamber behind the heat transfer surfaces. As the column of ice melts free of the mold, its inclination is such as to effect its axial displacement, through the bottom of the mold responsive to gravity, where it drops through a shear plate a preselected distance determined by the revoluble shank of a cutter turning on an axis perpendicular to the longitudinal axis of the mold channel and ice column which it intersects, or substantially so. The ice column is sheared into cubes or particles by the cutter which are caught in an underlying trough and harvested by a helical screw acting in the bottom of the trough for this purpose.

The recirculation of the water which is constantly trickling through the mold, combined with the meltage of formative ice, serves to provide a precooled supply of water constantly available for application to the heat transfer surfaces, and the formation of ice thereon is thus considerably accelerated.

In a preferred embodiment, adopted herein for purposes of illustration, the invention embraces a multiple mold construction which is essentially nothing more than a multiplication of the single mold form of the foregoing description to adapt it to mass production methods. In its detailed aspects, the invention, together with objects and advantages attendant upon its practice, are more fully set forth in the following specification, to which reference will now be made, taken in conjunction with the accompanying drawings, in which:

Fig. 1 is a front elevational view of one form of apparatus embodying the invention;

Fig. 2 is an end elevational view regarded from the right side of the apparatus as shown in Fig. 1;

Fig. 3 is a top plan view of the apparatus of Fig. 1;

Fig. 4 is an enlarged fragmentary sectional view taken along line 4—4 of Fig. 1;

Fig. 5 is a fragmentary front elevational view of the device shown in Fig. 4 with portions of the plastic strips broken away to reveal the underlying hollow fin structure;

Fig. 6 is a perspective view of one of the plastic strips;

Fig. 7 is a modified construction of a freezing unit having a heat insulating member arranged along its bottom;

Fig. 8 is a perspective view of a preferred form of freezing unit shown with parts broken away to reveal the relationship of the several parts;

Fig. 9 is an enlarged fragmentary sectional view taken along line 9—9 of Fig. 1;

Fig. 10 is a view corresponding to Fig. 9 of the modification of the invention shown in Fig. 13;

Fig. 11 is a fragmentary perspective view of a shear plate adopted for use with a helical cutter shown in Figs. 10 and 13;

Fig. 12 is a fragmentary perspective view of one of the cutters shown in Fig. 9;

Fig. 13 is a fragmentary elevational view shown partly in section of the helical type of cutter shown in Fig. 10 with the plastic strips omitted;

Fig. 14 is a diagrammatic representation of apparatus of the present invention embodying a single freezing unit; and Fig. 15 is a similar diagrammatic representation of a multiple freezing unit system embodying the invention.

Referring now more particularly to the drawings, Figs. 1 and 2, it will be seen that the apparatus comprises a water spray manifold A which delivers water to be frozen to a molding and freezing unit B from which columns of ice are formed and delivered to cutters C arranged beneath the molding and freezing unit. The ice is cut into small particles by the cutters C and is delivered into a trough D having a perforated bottom through which water may pass into the underlying tank E. The ice in the trough D is delivered by a conveyor helix 40 conforming to the perforated bottom of the trough. A pump F draws water from the tank E and delivers it through a riser 18 to the spray manifold A from whence it is recirculated in the manner just described.

The molding and freezing unit B will be understood by reference to Figs. 4, 5 and 8, in which it will be seen that the unit is comprised of a pair of walls having vertical hollow fins 20 which define a plurality of vertical parallel molding channels 22 slightly tapered so as to be a little larger in cross-sectional area at their bottoms than at their tops erected in back to back relationship at each side of a refrigeration chamber 24 having top and bottom closures 25 which seal the central portions of the chamber including the upper and lower extremities of the fins 20 in such a way as to leave the molding channels 22 unobstructed throughout their extent. The refrigeration chamber is completed with end walls 26 which, together with the other parts, are autogenously united together so as to form a pressure tight chamber. As will be seen in the following description, refrigerant is introduced within this chamber through the line 72 in which it evaporates to impress a chilling potential upon the walls defining the wall channels 22 so that when water passes from the spray manifold A by gravity through these channels, some of it is frozen therein to develop columns of ice in the molds. The refrigerant is evacuated through the line 74 at the top of the unit. During the thawing cycle, the refrigerant is intermitted and by reversing the cycle, the warm refrigerant from the compressor is introduced into the freezing chamber 24 through the line 74 so as to be effective in thawing the ice columns free of the mold channels 22. The columns thus drop gravitally into engagement with the cutter C for ultimate delivery to the trough D in the manner already described.

The outer extremities of the hollow fins 20 which define the mold channels 22 are each equipped with a plastic strip 28 which are caused to adhere to the fins centrally so as to extend to each side of the fin as viewed in Fig. 4, partially to close the mold channels. The purpose of these strips 28 is to prevent the water from splashing from one channel to another thereby to confine each column of ice formed to its own mold channel and to render it more uniform as to shape and size. Due to their poor thermal conductivity, the strips serve as insulators at the apices of the fins to prevent the freezing of membranes of ice between the several channels. When the refrigeration chamber 24 is subjected to the thawing phase, the columns of ice melt free evenly and slide down to the cutters independently of each other without binding and free from any obstruction formed on the columns.

The cutter mechanisms comprise a pair of parallel shafts 30 and 32 journaled in the end walls 34 of the trough D in such a manner that the revolutionary axis of the shafts 30 and 32 lie normal to the vertical axis of the mold channels 22 or substantially so. In a preferred embodiment, the shafts are provided with striker bars 36 which are fitted to a flatted portion of the shafts eccentrically so as to sweep in shear below the lower openings of the mold channels 22 as defined by the guide plates 38 which run along two sides of the exits of the mold channels in an axial horizontal direction, as may be viewed in Fig. 9. From this relationship, it will be seen that columns of ice fall until they are arrested by the shafts 30 and 32, exposing a portion of each ice column equal to the dimension G, Fig. 9, which is subject to being sheared by the cutters 36 upon being rotated with respect thereto. By making the distance G between the lower portions of the guide plates 38 to the top of the shafts 30 and 32, respectively, equal to the lateral dimensions of the mold channels 22, a cubelike particle of ice is formed. The particles fall into the trough D and are swept therefrom by the helical conveyor 40 which has a shaft 42 journaled in the end walls 34 of the trough. The power for driving the pump F, the cutters C and the helical conveyor 40 may be derived from a common prime mover not shown. As already mentioned, perforations 44 are disposed in the bottom of the trough D to carry away unfrozen water supplied in excess to that frozen in the mold channels by the spray manifold, and as may result from meltage. This water collected in the lower tank E provides a pre-cooled source of water supply for recirculation to the mold channels which accelerates the freezing cycle.

In Figs. 10 and 13, there is shown a substitute form of cutter, which comprises a pair of shafts 46 and 48 each of which carries a helical fin 50 in fixed relation thereto, which, when revolved, move relatively axially in shear past the bottoms of the mold channels. Since these cutters act to break the ice off in a direction that is 90° to that contemplated by the action of the cutters of Fig. 9, it is necessary to provide shear plates 52 at the exit end of the mold channels similar to that shown in Fig. 11. Here the mold channel openings are reprsented by apertures 54 defined by longitudinal member 56 and by cross members 58, which latter constitute the bearings with respect to which the actual shearing takes place by the relative displacement of the helical cutters 50. The cubes are gauged by the distance G, Fig. 10, representing the space between the shear plates 52 and the top of the shafts 46 and 48, respectively. By this means, the size of the particles to be severed is predetermined and maintained.

Fragment ice of small particle size is derived by intermitting the freezing cycle before a full column of ice is attained thus to permit the relatively thin shells of ice to fall incident to the commencement of the thawing cycle for engagement with the cutters and consequent fragmentation into small pieces. Another way, more theoretical than that just described for obtaining ice particles of varying sizes, may be realized from altering the cutting elements as to their radial dimensions, as to their number, angular placement, and speed of revolution; the last, in turn, being related to the speed of axial displacement of the columns themselves. Theoretically, high speed revolution of the cutters could intercept the columns and shear them before the latter had fallen the full distance to the shafts. Thus, crushed ice or shaved ice could by the product of the highest speed of revolution, grading up in thickness at diminishing speeds until the full displacement between shear plates and cutter shaft is realized.

A corresponding control, and a more practical one, provides that cutting devices having shafts of different diameters for a given length of cutter element, or elements of different lengths for a given shaft size, be interchangeably associated in the assembly. The former of these adaptations of cutter substitution, that is to say, cutters having shafts of varying diameters for a fixed element length, is preferred, since to vary the element length would require the changing of the shafts' centers for each cutter substituted, otherwise, the elements would not always pass in operative proximity to the shear plates' discharge openings. On the other hand, by making the shafts of the cutting devices larger or smaller, less or more displacement, respectively, of the ice columns is allowed, and the cut particles are sized accordingly. Therefore, cutters having larger shafts, in radial extent only slightly less than radial dimension to the cutting elements, will produce crushed or shaved ice, while progressively smaller shafts will produce larger particles, until finally, the smallest shaft and the greatest length of cutting elements will provide the largest particles. To go beyond this, it would be necessary to provide a cutter having greater radial extent, and to lower the bearings of the shafts in the end walls 34 of the trough, in order to increase the distance between the shear plates and the cutter shafts.

Referring now to Fig. 14, there is a diagram of the apparatus for the purpose of illustrating the freezing and thawing cycle. A compressor 60 delivers hot compressed and condensed refrigerant through valve 62, condenser 63 and the liquid tank 80, into the line 64, through the solenoid valve 65, and box section conduit 66, and, thence, to the line 68, which conducts it to a transfer tank 70. From the transfer tank, the refrigerant is conducted by a pipe line 72 through a solenoid valve 73 to the bottom of the freezing unit B where it passes through the conduit 66 in non-communicating relationship therewith into the interior of the refrigeration chamber 24, where it expands and reduces the temperature of the molding channels 22 to below the freezing temperature of water. It is removed from the top of the freezing unit as a gas through the line 74, and by automatic adjustment of the solenoid valve 76, into the return line 78 to the compressor, where it is again compressed and condensed and recirculated in this manner. An overflow conduit 71, in overflow position relative to the top of the transfer tank 70 connects at its lower end with the return line 78 to the compressor. During the freezing cycle, a capillary tube 77, associated with the overflow conduit 71, communicates temperature change in the event cold refrigerant escapes from the transfer tank to thermal responsive devices, which actuate valve 75 in line 68 to shut off the supply of refrigerant to the tank 70 before its capacity can be exceeded. When the level of refrigerant is lowered, the valve 75, automatically opens once again.

During the thawing cycle, the hot refrigerant at the condenser, by automatic adjustment closing the solenoid valve 65, and opening the solenoid valve 91, is discharged into the line 92, and, thence, to the top of the refrigeration chamber 24 by the automatic setting of the solenoid valve 76 placing lines 92 and 74 in communication, while closing line 78. The refrigerant flows as a warm gas into the refrigeration chamber, and displaces the cold refrigerant out of the latter back to the transfer tank 70 where it is accumulated. Gas collecting in the transfer tank is displaced through line 71 to the return line 78 to the compressor, where it is recirculated in the manner just described.

By way of recapitulation, the flow of refrigerant during the freezing cycle, Fig. 14, is determined by the following automatic setting of the valves: Valve 62 is open between the compressor 60 and condenser 63, and closed as to line 92. Valve 65 is open, and valve 75, being thermally responsive, is normally open during the freezing operation, unless temporarily closed by conditions of overflow in the transfer tank 70. The solenoid valve 73 is open, and the solenoid valve 76 is automatically set during the freezing cycle to place lines 74 and 78 in communication while closing off the line 92. This completes the circuit of refrigerant during the freezing cycle.

In the thawing cycle, valve 62 is open to line 92, and closed to the condenser 63. Solenoid valve 91 is open, and valve 76 is automatically set to place lines 92 and 74 in communication while closing off 78. The valve 73 remains open, this time to reverse flow of the refrigerant back to the transfer tank 70 and closes automatically after the refrigerant has been expelled from the refrigeration chamber. The valve 65 is closed during the thawing cycle, while excess refrigerant, gaseous and liquid, escapes from the transfer tank through the line 71, back to the compressor, where it is recirculated in the same manner.

In the multiple freezing unit system in Fig. 15, the overflow line 71 from the transfer tank 70, the thermo valve 75, and capillary tube 77 have all been omitted to simplify the presentation. It will be understood, however, that they apply to the same extent as in Fig. 14.

Referring now to Fig. 15, compressed and condensed refrigerant is passed by properly setting the valve 62 so as to flow from the compressor to the condenser, thence, into the liquid tank which affords a supply of the warm liquid refrigerant for application to the system. From the liquid tank 80 the refrigerant is moved to the line 82, into the manifold line 84, from whence it is delivered by the connecting lines 64 to the conduits 66, and, thence, through lines 68 and valves 86 to the transfer tanks 70, in a manner similar to that described in connection with Fig.

14. From the transfer tanks, the liquid is delivered by lines 72 into the bottom of the refrigeration chamber 24 of each of the molding and freezing units B and is drawn therefrom as a gas through the risers 74, positioned at the top of the refrigeration chambers, where by adjustment of the valves 88, it is delivered to the return manifold line 90, and back to the compressor to be recompressed, recondensed, and recirculated in accordance with this flow pattern just described.

During thawing cycle, the valve 62 is adjusted to permit the compressed refrigerant to flow directly into the line 92 where it is directed to the manifold line 94 for delivery through the valves 88 into the top of the freezing units B, which valves have been set for this purpose. As the valves 88 open the line between the manifold line 94 and the refrigerating chambers of the freezing units B, respectively, they, at the same time, act to close the manifold line 90. At the same time, the valves 86 are adjusted to permit the warm refrigerant to circulate in the reverse cycle back to and through the compressor which recirculates it.

Although it is evident that in accordance with conventional refrigeration practice, refrigerant may be conducted from the condenser under the impulsion of the compressor directly into the evaporation chamber of the freezing unit, it has in the present invention been first directed through the box section conduit 66 disposed along the bottom of the freezing unit between the mold channels and then to a transfer tank. The purpose for this arrangement is two-fold: (1) to precool the liquid refrigerant in the liquid stage, thus to reduce its pressure in part to provide for a quieter entrance of flow into the transfer tank; (2) to prevent the formation of random ice upon the bottom of the unit which would normally be formed by the drip of excess water escaping from the mold channels and flowing to the lowest point of the bottom of the freezing unit. The warm refrigerant passing through the box section 66 is effective in preventing such unwanted accumulation. A modified method of achieving this same result is illustrated in Fig. 7, wherein it will be seen that a plastic strip 100 of poor thermal conductivity is disposed across the entire bottom extent of the freezing unit between the mold channels in such a way as not to obstruct the latter. The heat transfer through such a strip is so poor as to preclude the freezing of the drip water along the bottom of the unit.

The transfer tanks 70 afford a ready supply of warm liquid refrigerant for direct release into the refrigeration chamber 24 of the freezing units by properly setting the valves which control the thawing cycle in the manner already described. In the thawing cycle, the transfer tank acts as an expansion chamber into which the liquid refrigerant is delivered and given its first opportunity to expand. The refrigerating effect caused by the phase change of the expanding liquid is retained in this tank rather than in the freezing unit 20. Therefore, it follows that the transfer tank could be replaced by another molding and freezing unit B in each instance which could be committed to the freezing cycle during the time the first unit is in the thawing cycle and vice versa. It is preferred, however, to have individual transfer tanks in the manner shown in Fig. 15 where multiple operations are involved and to stagger the cycle of the several units to effect a continuous production of ice without establishing two or more freezing units in series for this purpose. This gives greater flexibility of operation and can permit the time factor between the several stages to be altered at will in effecting the intervalization desired.

When the apparatus is adapted to the treatment of paraffin or other solidifiable oil and wax, especially in the "sweating" thereof as previously alluded to, the molding and freezing unit is disposed either horizontally or at a much greater angle to the vertical than that contemplated in the formation of ice. The transfer surface instead of being canalized to the extent previously described could be essentially flat and free from fins except that one or two might be applied to reduce the size of the sheet of wax under subsequent handling. The refrigerant in such case need be merely cool water or a medium of comparable heat extracting potential requiring a less elaborate refrigeration system. The main aspect of the invention as applied to waxes is the delivery of a thin film of liquid wax through a spray manifold or other suitable delivery means upon the heat transfer surface which may be refrigerated to solidification thereupon, and which, thereafter, may be sweated to excrete the non-solidifiable component by the successive application of a thawing medium beneath the transfer surface, which may be steam or warm water, followed by additional cooling cycles until the non-solidifiable liquid has been eliminated from the solid component in a manner and during an interval of time that is much more rapid and effective than any comparable system known today by virtue of the thin mass of wax under treatment. The final product is washed with a suitable solvent to eliminate the beads of oil that will have percolated to the surface. The solvent, of which naphtha is an example, may be applied by the same spray manifold which supplies the oil to be treated in the first instance. The resulting product is of a much higher degree of purity than is derivable from the older methods.

Prior art methods have heretofore used either the tank method, by which the freezing and thawing pipes are immersed in a tank of paraffin oil to be treated, or by the slab method, by which a larger mass of paraffin of considerable thickness is disposed upon a freezing and thawing unit for the same purpose. The present invention distinguishes and improves upon these prior art methods by providing for the quick and convenient formation of thin layers of films of paraffin from the solidifiable component of the paraffin oil, and by the automatic temperature control by which the sweating operation is instantaneous and thoroughly effective. By these means, the unit quantity of paraffin sweated can surpass that of the bulkier methods in a disproportionally smaller interval of time, thereby to accomplish a greater yield of product during a given operating period.

It is intended that the freezing and thawing cycles, effected by actuation of the several valves in the system in the manner already described, shall be fully automatic. The valves may be any having automatically-responsive controls associated therewith, such as solenoid valves, which are responsive to temperatures, pressure or mechanically displaced types of switches and relays, incorporated in the system so as to render its operation and control fully automatic in a desired preselected manner, all as is well known and understood in the art.

The claims are:

1. Congelation apparatus comprising an expansion chamber having substantially vertical, parallel molding channels in the outer surfaces of opposed walls thereof; a liquid feed manifold disposed along the top of said chamber for delivering liquid to be congealed to said channels; means beneath said chamber for collecting excess liquid draining from said channels associated with means for recirculating the drained liquid to and through said manifold; a compressor and a transfer tank; means for pumping condensed refrigerant from said compressor to said expansion chamber through said transfer tank; means for removing the refrigerant from the expansion chamber as a gas, and for conducting it back to the compressor, and means for cyclically opening said transfer tank to the low pressure side of the system thereby to reverse the flow of refrigerant to said expansion chamber.

2. Congelation apparatus comprising a heat transfer surface having a plurality of columnar molding grooves thereon; a revoluble cutter extending past one end of said grooves with its axis of revolution disposed at 90° to the longitudinal axes of said columnar molding grooves and intersecting the latter; a trough-like member underlying said cutter; a catch-basin underlying said member; conveyor means acting in said trough-like member for advancing particulate matter toward an end thereof; said member having perforations communicating with said catch-basin underlying the same.

3. The invention according to claim 2, including further means for delivering liquid to said molds comprising a pump associated with said catch-basin for circulating and recirculating the liquid content thereof to and through said molds, and a common drive means for said cutter and conveyor means and said pump effective to drive the two former and the latter in alternate succession.

4. Congelation apparatus comprising a heat transfer unit divided into columnar molds disposed to discharge contents therein gravitally; a cutter for gauging and cutting simultaneously solid matter delivered from a plurality of said molds; means for catching the cut solid particles adapted to separate them from liquid matter discharged therewith; means associated with the last-named means for delivering the solid particles from the apparatus; means for receiving the separated liquid; means for circulating the liquid to and through the columnar molds; a refrigerating system for said heat transfer unit including a compressor, a transfer tank, and an expansion chamber of which the heat transfer unit is a part, means for delivering refrigerant to the transfer tank in heat-transfer relation with the heat transfer unit adjacent the discharge end of said columnar molds; means for conducting refrigerant to said expansion chamber and for returning it to said compressor; and means effective to reverse the flow of the refrigerant to cause the transfer tank to act as an expansion chamber, and vice versa.

5. The method of congealing and treating liquids which comprises congealing thin strata of a liquid containing a congealable component and a non-congealable component therein upon a heat transfer surface; heating said surface to induce incipient melting of the congealed component to tend to free the noncongealed component therefrom; and repeating the congealing and incipient melting of said thin strata before removing it from said heat transfer surface until substantially all of the noncongealed component has been sweated from the thin congealed mass; then, melting the congealed mass sufficiently to free it from said surface, and delivering it therefrom.

6. In an apparatus for congealing liquids, a plurality of gravital-discharge molds for forming columns of solids; a revoluble shaft arranged beneath said molds to arrest the solids discharged from the molds; means carried by said shaft to sever the solids being discharged into smaller particles, and means for catching and delivering said particles from the apparatus; said molds being essentially square in right-section, and said shaft being arranged a distance below said molds substantially equal to a lateral dimension of said square, thereby to sever a cube like particle from the columnar solids bearing on the shaft.

7. A molding and freezing unit comprising a chamber, a wall of said chamber having a system of hollow fins communicating interiorly with said chamber and exteriorly defining a plurality of molding channels between them, said hollow fins at their exterior extremities having partial closures for said channels composed of material having low thermal conductivity affixed thereto and extending substantially throughout the axial extent of each fin, respectively.

8. The invention of claim 7, further characterized by the fact that said molding channels are inclined for the gravital discharge of matter disposed therein through and from the lower ends of said channels, and a mass of material of low thermal conductivity attached to the bottom of said chamber adjacent to and between the bottoms of said channels.

HAROLD M. REEDALL.

References Cited in the file of this patent

UNITED STATES PATENTS

| Number    | Name    | Date           |
|-----------|---------|----------------|
| 2,132,248 | Toyne   | Oct. 4, 1938   |
| 2,149,912 | Fuss    | Mar. 7, 1939   |
| 2,239,234 | Kubaugh | Apr. 22, 1941  |
| 2,256,973 | Doherty | Sept. 23, 1941 |
| 2,387,899 | Gruner  | Oct. 30, 1945  |
| 2,405,272 | Smith   | Aug. 6, 1946   |
| 2,453,140 | Kubaugh | Nov. 9, 1948   |
| 2,477,474 | Bert    | July 26, 1949  |
| 2,533,616 | Pace    | Dec. 12, 1950  |
| 2,598,429 | Pownall | May 27, 1952   |
| 2,598,430 | Pownall | May 27, 1952   |